United States Patent [19]

Baum et al.

[11] Patent Number: 5,525,392

[45] Date of Patent: Jun. 11, 1996

[54] MAGNETIC RECORDING MEDIUM HAVING A FLUORINATED POLYMERIC PROTECTIVE LAYER FORMED BY AN ION BEAM

[75] Inventors: Thomas H. Baum, New Fairfield, Conn.; Paul B. Comita, Menlo Park, Calif.; Mark S. Crowder, Gilroy, Calif.; George W. Tyndall, III, San Jose, Calif.

[73] Assignee: International Business Machines Corporation, Armonk, N.Y.

[21] Appl. No.: 514,476

[22] Filed: Aug. 11, 1995

Related U.S. Application Data

[63] Continuation-in-part of Ser. No. 392,274, Feb. 21, 1995, abandoned, which is a continuation of Ser. No. 161,683, Dec. 2, 1993, abandoned, which is a continuation of Ser. No. 988,561, Dec. 10, 1992, abandoned.

[51] Int. Cl.⁶ ..................................................... G11B 5/00
[52] U.S. Cl. .................. 428/65.5; 428/408; 428/421; 428/694 TF; 428/694 TC; 428/900; 427/131; 427/490; 427/496; 427/497; 427/551; 427/562
[58] Field of Search .............................. 428/64, 65, 421, 428/694 T, 694 B, 900, 694 TF, 408, 65.5, 694 TC; 427/131, 490, 496, 497, 551, 562

[56] References Cited

U.S. PATENT DOCUMENTS

| | | | |
|---|---|---|---|
| 4,252,848 | 2/1981 | Datta et al. | 428/64 |
| 4,264,642 | 4/1981 | Ferrali | 427/38 |
| 4,391,843 | 7/1983 | Kaganowicz et al. | 427/41 |
| 4,419,404 | 12/1983 | Arai et al. | 428/336 |
| 4,474,827 | 10/1984 | Ferrali | 427/38 |
| 4,551,778 | 11/1985 | Arai et al. | 368/131 |
| 4,636,435 | 1/1987 | Yanagihara et al. | 428/336 |
| 4,711,809 | 12/1987 | Nishikawa et al. | 428/336 |
| 4,778,582 | 10/1988 | Howard | 204/192.15 |
| 4,791,012 | 12/1988 | d'Agostino et al. | 428/35.3 |
| 4,808,455 | 2/1989 | Wada et al. | 428/64 |
| 4,816,334 | 3/1989 | Yokoyama et al. | 428/336 |
| 4,820,584 | 4/1989 | Morita et al. | 428/336 |
| 4,824,690 | 4/1989 | Heinecke et al. | 427/38 |
| 4,824,724 | 4/1989 | Ueda et al. | 428/336 |
| 4,835,070 | 5/1989 | Kurokawa et al. | 428/64 |
| 4,842,889 | 6/1989 | Hu et al. | 427/38 |
| 4,844,986 | 7/1989 | Karakelle et al. | 428/447 |
| 4,863,809 | 11/1989 | Brar et al. | 428/623 |
| 4,869,922 | 11/1989 | D'Agostino et al. | 427/38 |
| 4,871,580 | 10/1989 | Schram et al. | 427/38 |
| 4,889,767 | 12/1989 | Yokoyama et al. | 428/336 |
| 4,910,041 | 3/1990 | Yanagihara et al. | 427/37 |
| 4,925,733 | 5/1990 | Imataki et al. | 428/336 |
| 4,960,609 | 10/1990 | Homola et al. | 427/38 |
| 5,198,718 | 3/1993 | Davis et al. | 313/359.1 |

FOREIGN PATENT DOCUMENTS

| | | | |
|---|---|---|---|
| 61-270370 | 11/1986 | Japan | C23C 14/48 |
| 2040129 | 2/1990 | Japan . | |
| 02103723 | 4/1990 | Japan . | |
| 02137116 | 5/1990 | Japan | G11B 5/66 |
| 4067446 | 3/1992 | Japan . | |

OTHER PUBLICATIONS

Ion Implantation in Thin Film Overcoats for Magnetic Disks, IBM Technical Disclosure Bulletin, vol. 36, No. 03, pp. 333–334, Mar. 1993.

*Primary Examiner*—Stevan A. Resan
*Attorney, Agent, or Firm*—Robert B. Martin

[57] ABSTRACT

The present invention relates to a process for coating a magnetic recording device with a lubricating polymeric film using an ion beam generator.

22 Claims, 1 Drawing Sheet

MAGNETIC RECORDING MEDIUM HAVING A FLUORINATED POLYMERIC PROTECTIVE LAYER FORMED BY AN ION BEAM

This is a continuation-in-part of application Ser. No. 08/392,274 filed on Feb. 21, 1995 now abandoned, which is a continuation of Ser. No. 08/161,683 filed Dec. 2, 1993 (now abandoned), which was a continuation of Ser. No. 07/988,561, filed Dec. 10, 1992 (now abandoned).

FIELD OF THE INVENTION

The present invention relates to a process for coating a magnetic recording device with a polymeric film.

BACKGROUND OF THE INVENTION

Magnetic recording devices generally comprise a thin-film magnetic recording disk and a slider or head which is moved along the surface of the disk to read and/or write information on the disk.

Thin-film magnetic recording disks typically comprise a substrate, such as an aluminum-magnesium alloy with a textured surface coating such as nickel-phosphorous, a magnetic film such as a cobalt based metal alloy or a γ-iron oxide film, and a protective overcoat, such as a sputter-deposited hydrogenated carbon film. A lubricant, such as a polyperfluoroether, is often applied to the carbon overcoat. A general description of the structure of such thin-film disks is given in U.S. Pat. Nos. 4,610,911 to Opfer, et al., and 4,552,820 to Lin, et al.

The lubricant on the surface of the disk functions to reduce wear at the interface of the disk and slider or head as they are moved relative to one another during operation. Excessive wear can eventually lead to failure of the recording device. A second function of the lubricant layer is to reduce the static friction (stiction) between the head and disk. Excessive stiction can also lead to failure of the recording device upon start up.

Prior magnetic recording disks employed liquid lubricants. Liquid lubrication is typically applied via a solvent intensive process using fluorocarbon/chlorofluorocarbon solvents. However, the use of such solvents is being curtailed. Further, liquid lubricants can be depleted due to spin-off during operation. Also, the use of liquid lubricants can result in variations in the thickness of lubricant over disk surface. If the lubricant layer is too thin, it can cause excessive wear and if the layer is too thick, it can cause increased stiction between the head and disk. This is especially true on smooth disks, where capillary forces and meniscus formation lead to unacceptably high stiction at the head/disk interface.

In order to avoid the problems associated with the application of liquid lubricants, gas phase deposition of the lubricant was developed. Yokoyama et al., U.S. Pat. No. 4,816,334, issued Mar. 28, 1989 discloses gas phase deposition of polymeric lubricants onto the surface of magnetic recording disks. The gas phase of the lubricant is created by a variety of techniques such as evaporation, sputtering, ion plating and the like. In evaporation, the gaseous phase of the polymer is formed by heating or by an ion beam impinging on the surface of the polymer. The gas phase is then deposited onto the surface of the disk to form the layer of lubricant. Due to the relatively large size of the gaseous polymer molecules, however, they do not adhere well to the disk surface resulting in a film which is subject to peeling, crazing, cracking or the like. In addition, the gas phase deposition of polymers generally results in a film that exhibits a liquid-like behavior with the associated problem of stiction on smooth disks.

Arai et al., U.S. Pat. No. 4,419,404 issued Dec. 6, 1983, and Imataki et al., U.S. Pat. No. 4,925,733 issued 5/15/90 both disclose forming a polymeric film on the magnetic layer of a recording device by plasma polymerizing organic monomer gases. However, plasma polymerization is deficient because the deposition process, and hence the resultant film composition is difficult to control. This results primarily from the varied species impinging on the disk during the deposition process. For example, a typical plasma comprises ions of both positive and negative polarity (of widely varying energy), electrons, free radicals created from the precursor, and the parent molecule. Therefore, there still is a need in the art for forming an effective lubricating coating on magnetic recording devices.

It is therefore an object of the present invention to provide an improved process for forming a lubricating polymeric coating on a magnetic recording device.

Other objects and advantages will become apparent from the following disclosure.

SUMMARY OF THE INVENTION

The present invention relates to a process for coating a magnetic recording article with a lubricating polymeric film comprising the steps of: (i) placing the article in a chamber; (ii) evacuating the chamber; (iii) generating a beam of ions of one sign; and (iv) contacting the surface of the article with the beam and precursor gas to form the polymeric film on the article.

The key feature of the present invention is forming a polymeric film on the surface of the magnetic recording article with precursor gas using a beam of ions of one sign. The polymeric film functions as a lubricant for the magnetic recording article to eliminate wear and reduce stiction during operation. Preferably, the process is used to coat thin-film magnetic recording disks. Preferably, the precursor gas is a monomer gas which is preferably flowed into the chamber and over the surface of the article during the film forming step. Preferably the beam of ions is positively charged, and monoenergetic and preferably generated by an ion beam generator.

The present invention also relates to a magnetic recording article made by the process of the present invention.

A more thorough disclosure of the present invention is presented in the detailed description which follows and from the accompanying drawing, in which

DETAILED DESCRIPTION OF THE INVENTION

Figure 1:
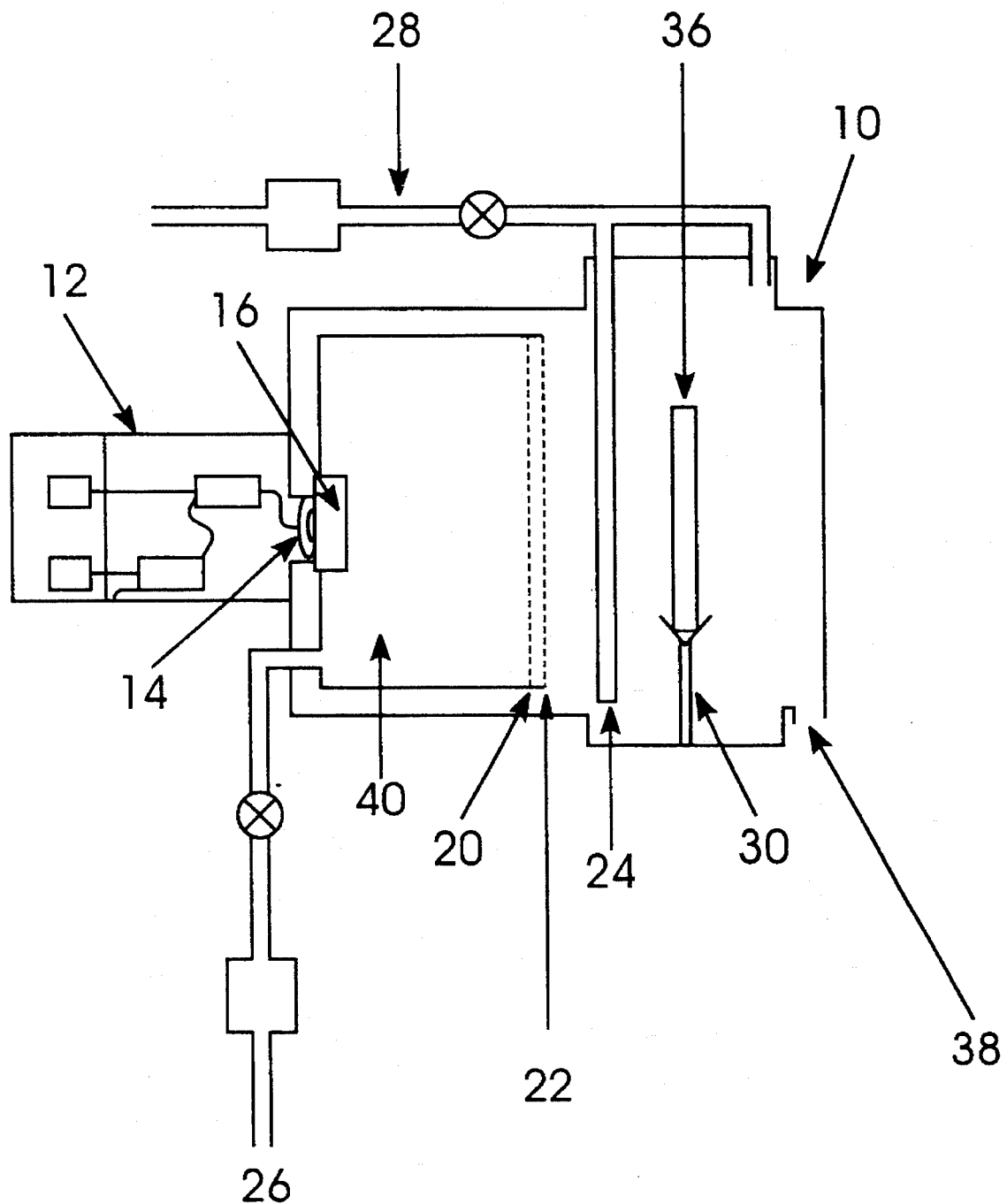
FIG. 1 is an assembly useful for performing the process of the present invention.

The present invention relates to a process for forming a polymeric film on the surface of a magnetic recording article.

Referring to FIG. 1, there is shown an assembly for forming the polymeric film on a magnetic recording device. The assembly generally comprises vacuum chamber 10 and radio frequency generated ion beam source 12. The RF source 12 generally comprises RF coil 14 (with associated electronics) adjacent to a ceramic window 16 disposed in the wall of chamber 10. Within the chamber are ion extraction grids 20 and 22 gas ring inlet 24, gas inlets 26 and 28, and substrate holder 30.

In the first step of the process of the present invention, the article (e.g. a disk) 36 is placed into the vacuum chamber 10 on substrate holder 30. In the preferred embodiment, the process is used to coat a thin-film magnetic recording disk. Suitable disks will generally comprise a textured or smooth substrate comprising for example aluminum, alumina, glass, carbon or plastic, an underlayer e.g. chromium, a magnetic layer comprising for example platinum, cobalt, chromium or iron oxide and an overcoat layer such as a carbon film. Other magnetic recording articles such as sliders, heads, tapes or suspension structures can also be coated with a polymeric film using the process of the present invention.

Preferably, the ion beam source is an ion beam generator. Suitable commercially available ion beam generators include D.C. filament source and non-filament sources such as an inductively coupled RF source or a microwave generated electron cyclotron resonance source.

In the second step of the process of the present invention, the chamber is evacuated through outlet 38 preferably to a pressure less than about $1\times10^{-3}$ torr (e.g. preferably less than about $1\times10^{-4}$ tort, more preferably less than about $1\times10^{-5}$ torr).

Generally, precursor gas is then flowed into the chamber. Preferably, the precursor gas is flowed into the chamber during the film forming step and more preferably the precursor gas is flowed over the surface of the disk 36 in contact with the disk surface during the film forming process. In one embodiment of the process of the present invention, the surface of the magnetic recording article is exposed to the beam of ions prior to the introduction of precursor gas into the chamber to pretreat the surface of the disk. Alternatively, the precursor gas can be introduced into the chamber before the beam of ions contacts the surface of the magnetic recording article. The precursor gas is conveniently introduced into chamber 10 through gas ring inlet 24 comprising a ring-shaped tube having a plurality of holes directed towards the disk 36 conveniently at a flow rate of about 1 to 15 sccm.

Suitable polymerizable precursor gas for use in the process of the present invention is a monomer gas or a low molecular weight oligomer gas preferably having a degree of polymerization of less than about 10, preferably less than about 5. Conveniently, the precursor gas will have, at ambient temperature, a partial pressure of more than about 1 mtorr, preferably more than about 50 mtorr more preferably more than about 1 torr. Suitable gases include hydrocarbon gases, halocarbon gases, silicon containing gases and nitrogen containing hydrocarbon gases and mixtures thereof.

Suitable hydrocarbon gases include alkanes, alkenes and alkynes such as, hexane, pentane, cyclopentane, butene and 1,3-butadiene, 2-butyne and benzene. Preferred hydrocarbon gases contain readily polymerizable moleties such as dienes, acrylates, styrene, alkenes and alkynes.

Suitable halocarbon gases include chloro and fluorocarbon gases such fluorinated alkanes such as carbon tetrafluoride, hexafluoroethane perfluoropropane, perfluorobutane and perfluorocyclobutane; fluorinated alkenes such as perfluoropropene, perfluorobutene, perfluorocyclopentene, hexafluorobutadiene, vinyl fluoride, pentafluorostyrene, fluorinated alkynes such as trifluoropropyne, hexafluorobutyne and fluoroacetylene, and other halohydrocarbons such as hexafluoropropylene oxide and copolymers of the above.

Other suitable gases include dimethyidifluorosilane, methyltrifluorosilane, tetramethylsilane, trisilylmethane, silane, tetraethoxysilane, trifluromethylaniline, trifluoroacetamide, and mixtures thereof. Other suitable gases will be known to those skilled in the art. The preferred gases for use in the process of the present invention are pentafluorostyrene and hexafluoroethane perfluoropropane and mixtures thereof.

In the next step of the process of the present invention, a beam of either positive or negative ions are generated in the ion beam generator. The design and operation of ion beam generators is known in the art. Both filament and non filament, gridded and nongridded ion beam generators can be utilized in the process of the present invention. However, to avoid source degradation and to enable beam focusing non filament, gridded ion beam generators may be more suitable in the process of the present invention.

Referring to FIG. 1, the assembly for performing the process of the present invention generally comprises vacuum chamber 10 and RF source 12 The RF source is preferably an inductively coupled RF at 13.56 Mhz. During the process, precursor gas and/or inert gas (such as argon, helium, hydrogen, nitrogen, xenon or mixtures thereof) is introduced into the ionizing chamber 40 through inlet 26 or 28. The RF coil is activated (preferred power of about 100 to 150 watts) and radio frequency energy is directed into the ionizing chamber 40 through ceramic window 16 to ionize the incoming gas. Only a small portion of the incoming gas is ionized. The un-ionized gas flows out of the ionizing chamber 40 through the grids 20 and 22 and over the surface of disk 36.

In the film forming step of the process of the present invention, the extraction and containment grids 20 and 22 are oppositely charged to a high voltage preferably d.c. of about + 200 to + 1000 volts for positive grid 20 (preferably about + 300 volts) and about −50 to −300 volts for negative grid 22 (preferably about −150 volts) to contain substantially all of the ions of one sign (e.g. all of the negative ions) in the ionizing chamber 40 and accelerate substantially all of the ions of the opposite sign in a beam through the grids 20 and 22 towards the disk 36. Preferably the ion beam comprises positive ions of the inert gas, the precursor gas or mixture thereof and more preferably comprises positive ions of a precursor gas. The ions in the ion beam generally have an energy of about 100 to about 600 electron volt. (eV) preferably about 300 eV. At ion beams energies greater than 600 eV, the beam can cause defluorination of fluorinated polymeric film which results in less fluorine content in the film with accompanying degradation in performance properties of the film such as lubrication. The ions in the ion beam are generally monoenergetic having a narrow energy distribution of about ±10%, preferably about ±5% more preferably about ±2%. The ion beam may be pulsed or continuous, preferably continuous. During the film forming step of the process, precursor gas is also preferably introduced into chamber 10 preferably through gas ring inlet 24 to flow over the surface of disk 36 in contact with the surface of the disk. The ions which are accelerated through the extraction grid of the ion beam generator collide with precursor gas molecules absorbed on or contiguous to the surface of the disk to cause polymerization of the precursor gas and the formation of a polymeric film on the disk surface. Preferably, after the polymeric film has been formed on the surface of the disk, the chamber is evacuated prior to terminating the ion beam. The resulting polymeric film has generally uniform thickness varying from 5Å to 1 micron and has excellent adhesion to the disk surface. The disk coated using the process of the present invention are suitable for both conventional flying head recording and also for contact recording. Optionally, during the process of the present invention, the disk can also be electrically biased at a potential of about 10 to 1000 volts preferably −100 volts with respect to the ion beam source to increase the acceleration of the ions towards the disk to improve the deposition rate and to minimize undesired deposition of the polymer elsewhere in the chamber.

In an alternative preferred embodiment of the process of the present invention, an ion beam generator may be disposed on each side of the disk to form a polymeric film on both sides of the disk in one operational step using the process of the present invention. In this embodiment, the ion beam generators can be operated sequentially or preferably simultaneously.

The present invention also relates to a magnetic recording article which is coated with a polymeric film formed by the process comprising the steps of:

(i) placing the article in a chamber;

(ii) evacuating the chamber;

(iii) generating a beam of ions of one sign; and (iv) contacting the surface of said article with the beam and precursor gas to form the polymeric film on the article.

Preferably, the precursor gas is flowed into the chamber and over the surface of the article during the film forming step. Preferably the magnetic recording article is a thin-film disk.

The following examples are detailed descriptions of the process of the present invention. The detailed descriptions fall within the scope of, and serve to exemplify, the more generally described process set forth above. The examples are presented for illustrative purposes only, and are not intended as a restriction on the scope of the invention.

EXAMPLE 1—D. C. Filament Ion Source

A thin-film magnetic recording textured disk (RMS roughness 60–70Å) comprised of: a) a nickel-phosphorous plated aluminum substrate, b) a chromium adhesion layer, c) a ferromagnetic layer, and d) an amorphous hydrogenated carbon protective overcoat, was placed into a vacuum chamber equipped with a Kaufmann type ion beam source (DC filament excitation) and evacuated to a pressure below $10^{-5}$ Torr. The thin-film disk is placed approximately 10 cm from the ion beam source at normal incidence. Hexafluoroisopropyl methacrylate (HIPM) is allowed to flow into the ion beam source (controlled by a molecular leak valve) until the pressure in the chamber rises to approximately $5 \times 10^{-4}$ Torr. The ion beam filament was charged thereby creating a discharge in the source. Positive ions created in the source were then extracted and accelerated to approximately 900 eV by the ion source grids. The thin-film disk was exposed to the HIPM generated ions for approximately 1 minute. The ion beam source is then turned off, the gas flow terminated, the vacuum system vented, and the thin-film disk removed from the chamber. The mechanical performance of the disk was evaluated using standard contact start/stop (CSS) testing using a modified Seagate drive. Testing was performed at 10% relative humidity (in air) using a standard IBM slider which imposes a load of 6 g on the disk. The test was performed for 10,000 CSS cycles. No visible wear was observed. The stiction at the end of the test averaged approximately 4 g.

EXAMPLE 2—RF Ion Source

A thin-film magnetic recording disk comprising a textured substrate, a chromium underlayer, a ferromagnetic layer and carbon overcoat was placed into a high vacuum chamber equipped with an R.F. ion beam source. The disk was electrically grounded. The chamber was evacuated and then argon introduced to the chamber at a flow sufficient to sustain a pressure of $1 \times 10^{-5}$ mTorr. Gaseous pentafluorostyrene (PFS) was introduced into the chamber at a partial pressure of $1 \times 10^{-4}$ mTorr and is flowed over the surface of the disk during the deposition process. The R.F. source was then charged to 100 Watts to initiate ion generation in the ion beam source. Ion extraction was accomplished with the first grid at +300 volts and the second grid at −100 volts to form a positive ion beam. Deposition is carried out for 10 seconds. The coated disk was then tested using standard contact start/stop testing. The mechanical performance displayed by the resulting disk was 4±1 grams after 10,000 contact start/stop cycles.

EXAMPLE 3—Textured Disk

A thin-film disk as described in Example 1 was placed into a vacuum chamber equipped with an inductively-coupled, Radio Frequency generated ion beam source. Again, the disk was placed approximately 10 cm from the ion beam grids at normal incidence and the background pressure of the chamber was evacuated to less than $10^{-5}$ Torr Argon at approximately 1 standard cubic centimeters per minute (sccm) was allowed to flow into the ion beam source. The RF generator was then turned on to create argon ions. The grids were electrically charged to extract and accelerate the argon ions (ion energies of about 500 eV) toward the disk surface. Pentafluorostyrene (PFS) was simultaneously admitted to the vacuum chamber and allowed to flow over the surface of the thin-film disk where interaction with the argon ions leaded to formation of the polymer layer. The disk was exposed to the above described treatment for about 10 seconds. The chamber was then evacuated and the disk removed. CSS testing was performed and the stiction after 100,000 cycles was 5±2 g.

EXAMPLE 4—Smooth Disk

A Nippon supersmooth carbon overcoated thin-film disk (RMS roughness 10–12Å) was placed in the vacuum chamber housing the RF ion source. The ion source was operated with nominally 1 sccm argon and a partial pressure of the precursor gas, hexafluoropropylene (HFP) of about 2–4 times that of the argon. Deposition was carried out for approximately 15–30 seconds using an ion energy of approximately 500 eV. The disk was removed and CSS tested to give 11±3 g after 30,000 cycles. Conventionally lubricated disk with comparable roughness generally display stiction in the range of 30–120 g after 30,000 cycles.

EXAMPLE 5—Dual Beam Operation

Two ion beam generators were placed in a Varian 1100 disk deposition tool in position opposing each other. Generally following the procedures of Example 3 (PFS and argon at 1 sccm; 10 sec. deposition; 300 eV ion energy) several thin-film disks were lubricated on both sides without breaking vacuum between carbon deposition and lubricant deposition. Each disk was successfully lubricated. CSS testing showed no failures due to wear and stiction values of 3–6 g were observed after 10,000 cycles.

EXAMPLE 6—Formation of a Copolymer Film

Generally following the procedure of Example III, a relatively smooth disk (RMS roughness=20–25 Å) was lubricated with a copolymer formed from the reaction of pentafluorostyrene monomer (PFS) and hexafluoroethane (HFE) monomer. The PFS was flowed over the disk and the HFE was introduced into the ion beam chamber. The deposition was done generally in accordance with Example 3 (PFS/HFE-1:1; 300V accelerator voltage and 10 sec. deposition) and the resulting disk displayed no wear in the CCS testing with stiction of about 4–8 g after 30,000 cycles.

EXAMPLE 7—Heads (Slider)

The ion beam coating technique described herein can also be used to deposit polymeric films on magnetic recording heads. Following the general procedure outlined above, a suspended magnetic recording head is placed into the vacuum chamber and the chamber evacuated to $10^{-6}$ Torr. The head was placed approximately 10 cm from the outer grid of a DC filament generated ion gun. Argon was introduced to the gun at a flow rate of 5 sccm. Positive Ar ions formed in the ion gun were accelerated to 600 V and allowed to impact the surface of the magnetic recording head. Simultaneously, pentafluorostyrene was introduced to the chamber and allowed to flow across the surface of the head. Deposition was carried out for 5–15 seconds, after which the ion gun power was turned off and the gas flow terminated. The resulting polymeric films ranged in thickness between 40–120 Å depending upon the exposure time. Twelve heads coated in the manner described above were used in contact start stop testing to determine the benefits of application of the polymeric coating to the magnetic recording head. Eight disks lubricated with two types of perfluoropolyether liquid lubricants, and four disks lubricated via the ion beam polymerization of pentafluorostyrene were tested with coated and uncoated heads. In the case of each disk, a dramatic decrease in the measured stiction was found regardless of the type of lubrication used on the disk. Typically, a stiction of around 8±2 grams was found after 10,000 cycles with an uncoated head, and a stiction of 4 ±1 gram was found on these same disks after 10,000 cycles using the heads coated with ion beam polymerized pentafluorostyrene.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A magnetic recording article having a fluorinated polymeric film on its surface formed by the process comprising the steps of:
   (i) placing the article in a chamber;
   (ii) evacuating the chamber;
   (iii) generating a beam of ions of one sign having an energy of about 100 to 600 ev; and
   (iv) contacting the surface of said article with said beam and a precursor gas to form the fluorinated polymeric film on the surface of the article.

2. The article of claim 1 wherein the beam is generated in an ion beam generator.

3. The article of claim 2 wherein the beam is a beam of positively charged ions.

4. The article of claim 3 wherein the precursor gas is a halocarbon gas.

5. The article of claim 4 wherein said precursor gas is selected from pentafluorostyrene, hexafluoroethane or mixtures thereof.

6. The article of claim 4 wherein said article is a thin-film magnetic recording disk.

7. The article of claim 4 wherein said ions are monoenergetic.

8. The article of claim 7 wherein said ions have an energy of about 100 to about 1000 eV.

9. The article of claim 1 wherein the surface of the article is a carbon surface.

10. A process for forming a fluorinated polymeric film on the surface of a magnetic recording article comprising the steps of:
    (i) placing the article in a chamber;
    (ii) evacuating the chamber;
    (iii) generating a beam of ions of one sign having an energy of about 100 to 600 ev; and
    (iv) contracting the surface of the article with the beam and precursor gas to form the fluorinated polymeric film on the surface of the article.

11. The process of claim 10 wherein the beam is generated in an ion beam generator.

12. The process of claim 11 wherein the beam is a beam of positively charged ions.

13. The process of claim 12 wherein the precursor gas is a halocarbon gas.

14. The process of claim 13 wherein said precursor gas is selected from pentafluorostyrene, hexafluoroethane or mixtures thereof.

15. The process of claim 13 wherein said article is a thin-film magnetic disk.

16. The process of claim 12 wherein said ions are monoenergetic.

17. The process of claim 16 wherein said ions have an energy of about 100 to about 1000 eV.

18. The process of claim 1 wherein the surface of the article is a carbon surface.

19. A process for forming fluorinated polymeric film on the surface of a magnetic recording disk comprising the steps of:
    (i) placing said disk in a chamber;
    (ii) evacuating the chamber;
    (iii) generating in an ion beam generator a beam of positively charged ions having an energy of about 100 to 600 ev; and
    (iv) contacting the surface of said disk with the beam and a fluorocarbon gas to form the fluorinated polymeric film on the surface of the disk.

20. The process of claim 19 wherein the ions are monoenergetic.

21. The process of claim 20 wherein the ions have an energy of about 100 to about 1000 eV.

22. The process of claim 19 wherein the surface of the disk is a carbon surface.

* * * * *